US011479381B2

(12) United States Patent
Habenschaden et al.

(10) Patent No.: US 11,479,381 B2
(45) Date of Patent: Oct. 25, 2022

(54) APPARATUS COMPRISING QUICK-CHANGE DISC SUPPORT AND DISPLACEABLE GUIDE CURVE

(71) Applicant: KRONES AG, Neutraubling (DE)

(72) Inventors: Nina Habenschaden, Regensburg (DE); Konrad Senn, Alteglofsheim (DE); Gabriel Seibold, Obertraubling (DE); Harald Effenberger, Schierling (DE); Sascha Bauer, Wiesenfelden (DE)

(73) Assignee: KRONES AG

( * ) Notice: Subject to any disclaimer, the term of this patent is extended or adjusted under 35 U.S.C. 154(b) by 157 days.

(21) Appl. No.: 16/632,249

(22) PCT Filed: Aug. 30, 2018

(86) PCT No.: PCT/EP2018/073398
§ 371 (c)(1),
(2) Date: Jan. 17, 2020

(87) PCT Pub. No.: WO2019/043122
PCT Pub. Date: Mar. 7, 2019

(65) Prior Publication Data
US 2020/0231318 A1 Jul. 23, 2020

(30) Foreign Application Priority Data
Aug. 31, 2017 (DE) ...................... 10 2017 120 083.5

(51) Int. Cl.
*B65C 9/04* (2006.01)
*B65C 9/46* (2006.01)
(Continued)

(52) U.S. Cl.
CPC ................ *B65C 9/045* (2013.01); *B65C 9/46* (2013.01); *B65G 29/00* (2013.01); *B65G 47/846* (2013.01)

(58) Field of Classification Search
CPC .......... B65C 3/065; B65C 9/04; B65C 9/045; B65C 9/46; B65G 29/00; B65G 47/846; B65G 47/847; B65G 47/848
See application file for complete search history.

(56) References Cited

U.S. PATENT DOCUMENTS

| 4,456,114 A * | 6/1984 | Mohn ...................... B65C 9/06 |
| | | 198/377.06 |
| 7,980,380 B2 | 7/2011 | Thielmann ............... 198/377.01 |

(Continued)

FOREIGN PATENT DOCUMENTS

| CN | 2747165 | 12/2005 | ............. B65C 9/04 |
| CN | 102883976 | 1/2013 | ............. B65G 29/00 |

(Continued)

OTHER PUBLICATIONS

Chinese Office Action issued in Chinese Patent Appln. Serial No. 2018800457047, dated Dec. 31, 2020, English translation, 14 pages.

(Continued)

*Primary Examiner* — George R Koch
(74) *Attorney, Agent, or Firm* — Hayes Soloway P.C.

(57) ABSTRACT

Apparatus for handling containers has a support which is rotatable about an axis of rotation (D), wherein a plurality of receiving discs are arranged on the support, wherein the receiving discs are each rotatable about axes of rotation and are suitable and intended for supporting the containers. The apparatus includes a drive, which is rotatable about predetermined axes of rotation are arranged on the support and which is coupled non-rotatably to the receiving discs, and arranged on the support, wherein the rotary discs can be removed from the drive, and the drive and/or the rotary discs have a coupling for transmitting torque between the drive and the receiving discs.

17 Claims, 5 Drawing Sheets

(51) Int. Cl.
  *B65G 29/00*   (2006.01)
  *B65G 47/84*   (2006.01)

(56) References Cited

U.S. PATENT DOCUMENTS

| | | | |
|---|---|---|---|
| 8,215,365 B2 | 7/2012 | Bittner et al. ............... 156/538 | |
| 2006/0117708 A1* | 6/2006 | Thielmann .............. B65C 9/045 | |
| | | | 53/281 |
| 2009/0014281 A1* | 1/2009 | Eder ........................ B65C 9/06 | |
| | | | 198/377.1 |
| 2009/0277750 A1* | 11/2009 | Dewert ................ B65G 47/846 | |
| | | | 198/470.1 |
| 2010/0006174 A1* | 1/2010 | Till ....................... B65B 59/005 | |
| | | | 141/1 |
| 2011/0272245 A1* | 11/2011 | Papsdorf ................ B65G 29/00 | |
| | | | 198/471.1 |

FOREIGN PATENT DOCUMENTS

| | | | |
|---|---|---|---|
| DE | 8624351 | 11/1986 | ............... B65C 9/04 |
| DE | 8816774 | 4/1991 | ............... B65C 9/04 |
| DE | 20114062 | 2/2002 | ............... B65C 9/04 |
| DE | 10032091 | 6/2002 | ............... B65C 9/04 |
| DE | 102008012209 | 9/2009 | ............... B65C 3/16 |
| EP | 1657162 | 5/2006 | ............... B65C 9/04 |
| GB | 2091201 | 7/1982 | ............ B65G 29/00 |
| WO | WO2005123553 | 12/2005 | ............ B65G 47/84 |

OTHER PUBLICATIONS

German Search Report (w/machine translation) issued in application No. 10 2017 120 083.5, dated Feb. 5, 2018 (10 pgs).
International Search Report (w/translation) and Written Opinion (w/machine translation) issued in application No. PCT/EP2018/073398, dated May 15, 2019 (27 pgs).

* cited by examiner

APPARATUS COMPRISING QUICK-CHANGE DISC SUPPORT AND DISPLACEABLE GUIDE CURVE

This application is a 371 of PCT/EP2018/073398, filing date Aug. 30, 2018.

BACKGROUND OF THE INVENTION

The present invention relates to an apparatus for handling containers, wherein the apparatus has a quick-change device and a sophisticated guide fitting. Such an apparatus can be used for example for transporting containers, for example plastic containers.

Apparatus for handling or for example for transporting containers are known in the internal prior art of the applicant. In order to be able to handle or transport containers with different diameters, in the internal prior art of the applicant for every container size special fittings can be produced, which are then replaced in each case in the event of a product change. Furthermore, in the internal prior art of the applicant all container discs are lifted out of an apparatus.

The disadvantage of the apparatus known from the internal prior art of the applicant is that in the event of a container change they provide for changeover of the fitting parts, and likewise the individual receiving discs must be released and removed from the apparatus. This leads to a product change being associated with high costs and long changeover times.

The object of the present invention is to provide an apparatus which overcomes the disadvantages known from the internal prior art of the applicant and ensures a variable adaptation to different container sizes, preferably without the need of a complete change of fittings. Substantially simpler handling with respect to the receiving discs should also be demonstrated. With the aid of this apparatus the changeover times for such an apparatus can be considerably shortened, which also leads to a cost saving. Furthermore, the entire changeover process can also be carried out more simply with the present apparatus.

SUMMARY OF THE INVENTION

An apparatus according to the invention for handling containers has a support which is rotatable about an axis of rotation, wherein a plurality of receiving discs is arranged on the support. In this case each of these receiving discs is rotatable about an axis of rotation and is suitable and intended for supporting the containers.

Furthermore, according to the invention drive means which are rotatable about predetermined axes are arranged on the support and which are coupled non-rotatably to the receiving discs. The rotary discs can be removed from the drive means. The drive means and/or the rotary disc have coupling means which enable a transmission of torque between the drive means and the receiving discs.

The coupling means are preferably formed in two parts. A first part preferably achieves a rotary coupling by means of a form fit. This first part can be formed for example as a toothing or a plurality of projections. A second part preferably produces an axial coupling. For example, the axial coupling is produced by means of a magnetic force and/or by means of weight force. The coupling is preferably configured in such a way that a coupling is produced autonomously upon insertion of a receiving disc. In this case "autonomously" is understood to mean that an operator does not have to do anything other than to insert the receiving disc and the coupling is produced by itself, that is to say without further action by an operator.

A drive means is preferably associated with a respective rotary disc. This has the advantage that a simpler construction can be guaranteed and in the event of a malfunction it is possible to react more quickly since the drive means on which the malfunction occurs is immediately discernible. The rotary discs are advantageously arranged on the external circumference of the rotatable support. In this case it is particularly preferable if the rotary discs are arranged one behind the other in a circumferential direction. The greatest possible number of rotary discs can be arranged with such an arrangement. The complete external circumference of the rotatable support is advantageously occupied by rotary discs.

In a preferred embodiment the receiving discs have receiving regions. These receiving regions are suitable and intended to receive a base or a base region of a container. In this case a container to be received may be, for example, a plastic bottle or a glass bottle. The receiving discs preferably have receiving troughs for this purpose. In this case these receiving troughs are preferably adapted to the base of the containers to be handled, so that the container is, for example, arranged upright in the receiving disc and in this case is also positioned non-rotatably. In this case "upright" is understood to mean that the container is located in its normal position, that is to say that the base region of the container is closer to the ground or to the receiving region of the rotary disc than, for example, the mouth region of the container.

In a preferred embodiment the apparatus has at least one decorating device, which enables the decoration of the containers. Such a decorating device can be, for example, a labelling device or a printing device or the like, which is suitable and intended for applying for example a label or a print to a container.

This decorating device is advantageously arranged stationary. In this case it would be conceivable to arrange the decorating device directly on the apparatus or also in the immediate surroundings thereof. The "immediate surroundings thereof" is understood to mean that the decorating device is arranged directly alongside the apparatus.

The apparatus advantageously has second retaining means. These retaining means are suitable and intended for additionally holding the containers to be handled. For example, it would be conceivable that the second holding means retain the containers on the mouth region thereof.

In this case, for example, these holding means could be designed as holding mandrels and, for example, could also engage in a mouth region of the containers. In this case, furthermore, it would be conceivable that also these holding means or holding mandrels are also arranged rotatably. Furthermore, it would also be conceivable that these holding elements or holding mandrels are supplied by means of an own drive and thus are rotated. In this case it would be advantageous if the drive of the drive means were coupled to the drive, for example, of the holding mandrels.

The coupling means preferably have projections arranged on the receiving discs and/or on the drive means. These projections are suitable and intended for engaging in recesses arranged on the drive means and/or on the receiving discs.

In a preferred embodiment a plurality of recesses are arranged on the drive means and/or the receiving discs. In this case these recesses are preferably arranged adjacent to one another in the peripheral direction and, furthermore, are preferably spaced apart from one another in the peripheral direction. This spacing is (relative to the axis of rotation of the 35 support) preferably less than 60°, preferably less than 20°, preferably less than 10°. Thus, a series of recesses adjacent to one another is produced in such a way that even in the event of slight movements an engagement always occurs. In this case, however, a series should not be understood as a straight line, but rather the recesses are lined up in a circular shape.

It is advantageous that a plurality of recesses are provided, since in this way assembly can be implemented substantially more simply and quickly, since it offers a plurality of possibilities as to how, for example, the receiving disc is fitted and thus there is not only one specific predetermined position in which the receiving disc must be fitted.

The apparatus preferably has at least one disc support. At least one receiving disc is arranged rotatably on this disc support. Due to this rotatability of the receiving discs, containers can be held but remain rotatable about their longitudinal axis. The disc support is preferably removable from the apparatus jointly with the receiving disc arranged on the disc support. The same applies in the event that the receiving discs are installed. The disc support can preferably be installed on the apparatus jointly with the receiving disc arranged on the disc support.

The receiving discs and the disc supports are preferably designed so that, during insertion and/or installation of a disc support, the receiving discs are autonomously centred on the drive means and are preferably coupled non-rotatably thereto. In a preferred embodiment it would be conceivable that a combination of a draft angle and a magnetic force supporting the weight force leads to a positively engaging coupling.

A receiving disc is preferably received in a disc support with so much clearance that in an introduced/installed state the receiving disc can rotate without contact in the receptacle of a disc support. Furthermore, the receiving discs are preferably capable of carrying out a lifting movement in the axial direction initiated by a drive means. In this case this lifting movement is preferably between 1-50 mm, preferably between 2-30 mm and particularly preferably between 5-10 mm. In the event of such a movement the receiving discs preferably do not touch the disc supports. Advantageously, because of this clearance fit it is possible to dispense with a costly axial and radial support between receiving disc and disc support.

A fitting device which is dependent upon a container to be handled is preferably installed on the disc support, so that during a transfer into the machine a container is centred between it and an outer fitting. With such a fitting device it is preferably possible to ensure a reliable transfer of a container to a receiving disc.

In a case where all disc supports are inserted and/or installed, an inner fitting star is preferably formed with as many recesses as there are receiving discs. Preferably in this case the contour of the inner fitting star is configured so that this, together with the outer fitting, can ensure that the containers are reliably received in the receiving discs. During rotation of the receiving disc and thus also during rotation of the containers (and also in the prestressed state) the containers are preferably not touched by the fitting star. Thus, damage to a container can preferably be avoided.

Advantageously the disc supports can be locked on the rotatable support and/or released therefrom by means of a self-locking lever construction and/or by means of a movable lift curve. For example, the disc support could be released by actuation of the lever in the direction of the axis of rotation of the support. In this case, for example, an inclination of the lever of, for example, 30° is necessary. If the lever is in the released position a disc support could be locked, for example, by actuation of the lever in the opposite direction. In this case a lever could preferably be associated with each disc support, so that locking and/or release of the individual disc supports are brought about.

In order to preclude release of the disc supports they can be additionally fastened, for example, magnetically, by means of latching with springs, a click closure or in some other way. In addition to the mechanical locking, it would be conceivable that by means of a sensor system, for example, a camera system, ultrasound, scanners, RFID, inductive/capacitive sensor system or the like, the disc support can be checked, for example, for correct seating or presence or the like. Preferably not only the disc supports per se, but also receiving discs located in the disc supports are checked.

A further conceivable variant for release of the container receiving elements is a movable curve which can only be moved in the inching mode. In this case this curve could lift the elements out of the magnets at a defined position for changing, so that force-free replacement of the container receiving elements is made possible.

Thus, in a preferred embodiment the receiving discs can be manually pulled off from the support in the released position of the lever. In this case it would be possible to manually lift off the disc supports upwards. In the released or opened position of the lever the disc supports can also be mounted or inserted on the rotatable support.

In a preferred embodiment several receiving discs are connected by means of a disc support. At least two receiving discs, preferably at least three receiving discs, are preferably arranged on the disc support. Preferably at most eight receiving discs, preferably at most six receiving discs, preferably at most five receiving discs and particularly preferably at most four receiving discs are arranged on the disc support. In this case each disc support is advantageously designed as a segment of a circle.

Thus, depending upon the number of interconnected receiving discs a specific number of disc supports could produce a full circle. In this case, however, it is advantageous that not too many receiving discs are associated with a single disc support. This is due to the fact that a disc support with too many receiving discs arranged therein is too heavy and also becomes ever more unwieldy as the size increases. The consequence of this is that installation and removal of the disc supports is more awkward and takes more time.

Such a system offers the advantage, for example for the embodiment in which three receiving discs are connected to one another on a disc support, that it is possible for an operator when changing the receiving discs, for example because of a change of type, to change three receiving discs at once. Due to this provision the time for changeover can be shortened considerably.

The receiving discs are preferably centred autonomously relative to the drive means by means of a draft angle. Thus, it would preferably be possible that in the event that the receiving discs are not correctly positioned they slip or slide autonomously into a correct position. Furthermore, it is preferable that the receiving discs can be connected by positive engagement and non-rotatably to the drive means by means of a connecting unit such as, for example, by means of stud bolts or the like. In this case it would be conceivable that the connecting unit such as, for example, stud bolts, is arranged on the receiving disc on the underside, that is to say the side facing the drive means. This connecting unit can then preferably engage in the recesses of the drive means, so that the positively engaging and non-rotatable connection can be produced.

It is also preferable that starting from the axis of rotation of the support a guide fitting is provided which is bent and spaced-apart in the radial direction relative to the receiving disc, so that a transport path of the containers is produced between the receiving disc and the guide fitting.

In a preferred embodiment the guide fitting has adjustment means for changing a radius of curvature of the guide fitting. In this case these adjustment means can be configured, for example, as guide tracks. The guide fitting can preferably be adjusted automatically and thus can preferably be adapted to a diameter of the containers. The guide fitting is preferably displaceable in the radial direction in particular by means of a servo motor. A spindle is advantageously driven by a servo motor, so that, for example, a spindle nut is displaced positionally precisely in the axial direction. In this case, for example, the spindle nut can be connected by means of a pin to a slide curve which in turn is connected by means of linear guides and bolts or the like to the individual slide elements.

The width of the transport path can preferably be changed by the displacement of the guide fitting. Advantageously, the width of the transport path can be adapted by the displacement of the guide fitting to the diameter of the containers which are being handled or transported. Advantageously, by retraction and extension the guide fitting can change the width of the transport path by up to 75 mm. The guide fitting is preferably designed as a guide curve. The counterpart piece of the guide curve is preferably designed as an inner fitting which is arranged, for example, on the inner fitting star or, for example, on a disc support or, for example, on a receiving disc.

It would be conceivable that, for example, all guide tracks are coupled to one another. In other words, all guide tracks move synchronously relative to one another. Furthermore, however, it would also be conceivable that the individual guide tracks do not move synchronously relative to one another. Because of the advantageous coupling of the individual guide tracks, it would certainly be conceivable that the individual guide tracks move successively and thus the guide curve is adapted to a diameter of the containers.

In a preferred embodiment the radially adjustable guide track is connected to the support so that when this support is adjusted with respect to its height in the event of a product changeover, for example to a different container type, the guide track moves therewith, so that it does not have to be adjusted additionally/separately.

The present invention further relates to a method for handling containers with a support rotatable about an axis of rotation. A plurality of receiving discs are preferably arranged on the support, wherein the receiving discs are in each case rotatable about axes of rotation and support the containers.

Furthermore, according to the invention drive means which are rotatable about predetermined axes are arranged on the support. These drive means are coupled non-rotatably to the receiving discs, wherein the rotary discs can be removed from the drive means. The drive means and/or the rotary disc have coupling means which enable a transmission of torque between the drive means and the receiving discs.

The apparatus which is advantageously provided offers the advantage that due to the combination of the quick-change device and the automatic fitting adjustment the number of parts to be changed is considerably reduced since, for example, a guide fitting no longer has to be changed and, for example, in the embodiment in which three receiving discs are arranged on a disc support only ⅓ of the receiving discs must be changed. Such a saving of elements to be changed and thus also a saving of time results only from the combination of the quick-change device and the automatic fitting adjustment.

Furthermore, in the internal prior art of the applicant, an additional support/orientation in the base region of the containers to be handled or to be transported in conjunction with an inlet fitting has been necessary hitherto, since on the feed starwheel a correct orientation on a centring pin is already required.

In the apparatus according to the invention, on the one hand, the container-specific inlet fitting can be dispensed with completely and the support of the base region is now in combination with the new receiving disc system. Furthermore, due to the apparatus proposed here, with the automatic fitting adjustment, it is possible to dispense with further change parts.

It is pointed out that the guide fitting described here can also be used independently of the invention described above. The applicant therefore reserves the right to claim protection for a guide fitting or a guiding device for guiding objects and in particular containers. In this case this guide fitting has an in particular elongate guide element along which the objects or containers can slide.

Furthermore, the guide fitting has a support device on which the guide element is arranged, wherein the guide element is arranged movably relative to this support device. Preferably at least two adjustment devices which are spaced apart from one another in the extension direction of the guide element and by means of which a spacing between the support device and the guide element can be changed. In this case these adjustment drives are in particular linear drives, which have a linearly movable lifting element which is arranged on the guide element.

At least one lifting element is preferably arranged on the guide element so as to be movable in the extension direction thereof and in particular so as to be displaceable in the extension direction thereof, and another lifting element is arranged fixedly relative to the guide element in the extension direction thereof.

At least one of the lifting elements is preferably arranged pivotably on the guide element. The guide element is preferably designed as a sliding rail. The lifting elements are preferably arranged on the guide element in such a way that a position of the guide element relative to the support device can be changed by a movement of the lifting element.

The lifting elements are preferably arranged on the guide element in such a way that a radius of curvature of the guide element can be changed by a movement of the lifting elements. The guide element is preferably a flexible and or bendable element.

In a further advantageous embodiment the adjustment devices each have a base element relative to which the lifting elements are linearly movable. The adjustment devices are particularly preferably designed as hydraulic, pneumatic and/or electric motor-powered drives. In this case the lifting element can have a piston element which is movable relative to the base element. Joints can preferably also be provided in order to articulate the lifting element or elements on the guide element.

A sliding element, such as in particular but not exclusively a groove block, is preferably arranged on the lifting element and can slide in a guide element, such as for example a 35 guide groove, arranged in the guide element.

In a further advantageous embodiment the apparatus has at least three, preferably at least four and preferably at least five of the said lifting elements. In this case one of the lifting elements is arranged fixedly in the extension direction of the guide element relative to this guide element, and the remaining guide elements are arranged movably and in particular displaceably in the extension direction relative to the guide element.

In a further advantageous embodiment the lifting element which is arranged fixedly on the guide element in the extension direction thereof is a lifting element which is at the end in the extension direction. In this way an adjustment of the guide element can be achieved in a particularly favourable manner by a controlled movement of the individual lifting elements.

In a further preferred embodiment the guide element has a guide groove, in particular in the form of a dovetail guide, in which the individual lifting elements and in particular guide blocks arranged thereon can slide.

BRIEF DESCRIPTION OF THE DRAWINGS

Further advantages and embodiments are disclosed by the appended drawings.

In the drawings:

FIG. 6a shows a rough schematic representation of a guide fitting in the retracted state.

DETAILED DESCRIPTION OF THE INVENTION

Figure 1:
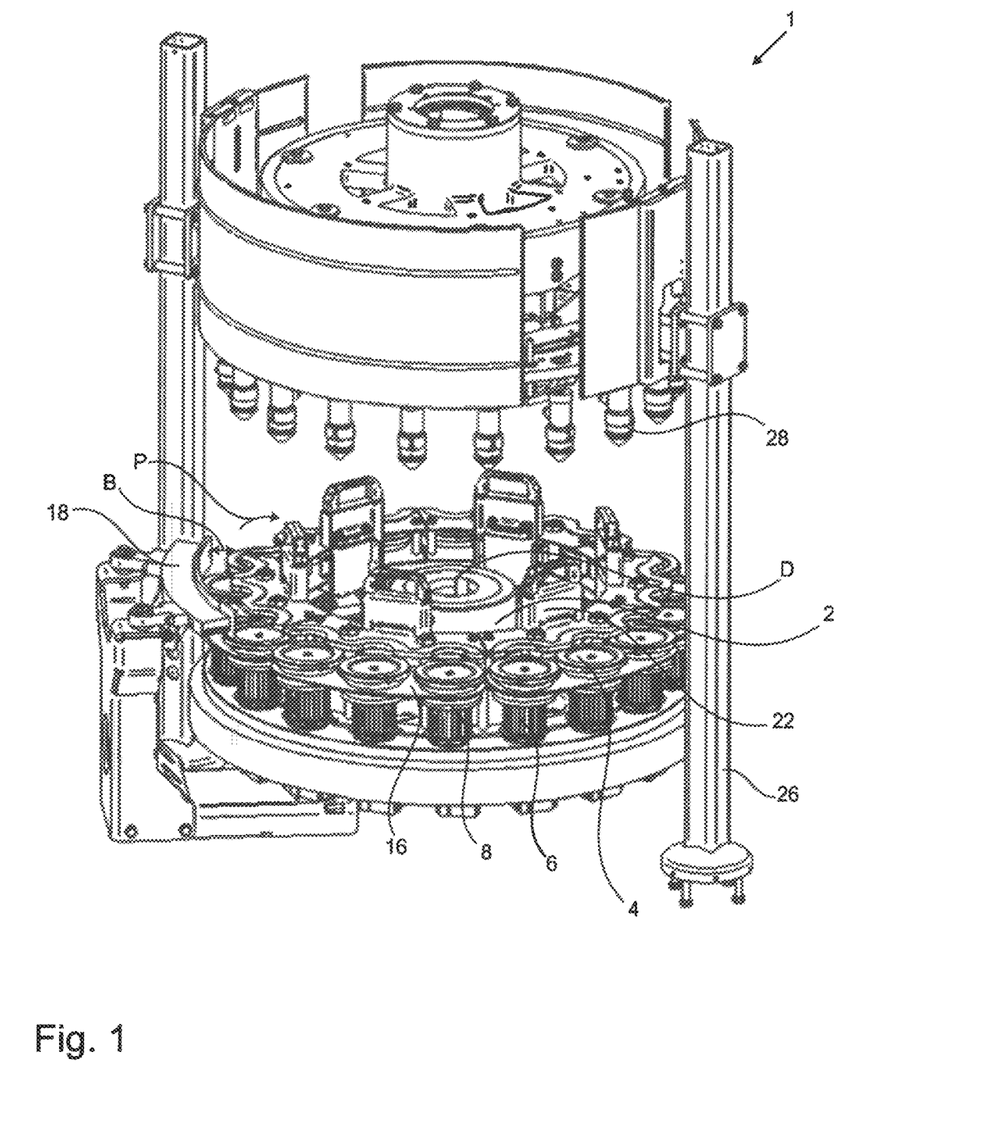
FIG. 1 shows a rough schematic representation of an apparatus according to the invention.

FIG. 1 shows a rough schematic representation of an apparatus 1 according to the invention. The support 2 which is rotatable about an axis of rotation D can be seen in the drawing. Likewise, the plurality of receiving discs 4, which are each rotatable about axes of rotation can also be seen. Furthermore, these receiving discs 4 are suitable and intended for supporting containers 10 whilst they are being handled and/or transported.

The rotatable drive means 6 can be seen which are arranged around a predetermined axis of rotation on the support 2. These drive units 6 are coupled to the receiving discs 4 by means of coupling means 8. The disc supports 16 are only illustrated roughly here. With reference to this drawing the guide fitting 18 can also be seen which, starting from the axis of rotation D of the support 2, is arranged spaced apart from the receiving discs in the radial direction. It will be recognised that the guide fitting is curved and the width B of a transport path P can be changed by retraction and extension. Furthermore, the lever construction 22 can be seen which makes it possible to remove the individual disc supports 16 from the apparatus 1.

It will be recognised that here the exemplary embodiment is shown, in which three receiving discs 4 are arranged on a disc support 16. In addition to the lever construction 22 the movable lifting curve 26 can also be seen. Furthermore, the further holding elements 28 can be seen, which are suitable and intended for holding the containers 10 in the mouth region thereof.

Figure 2:
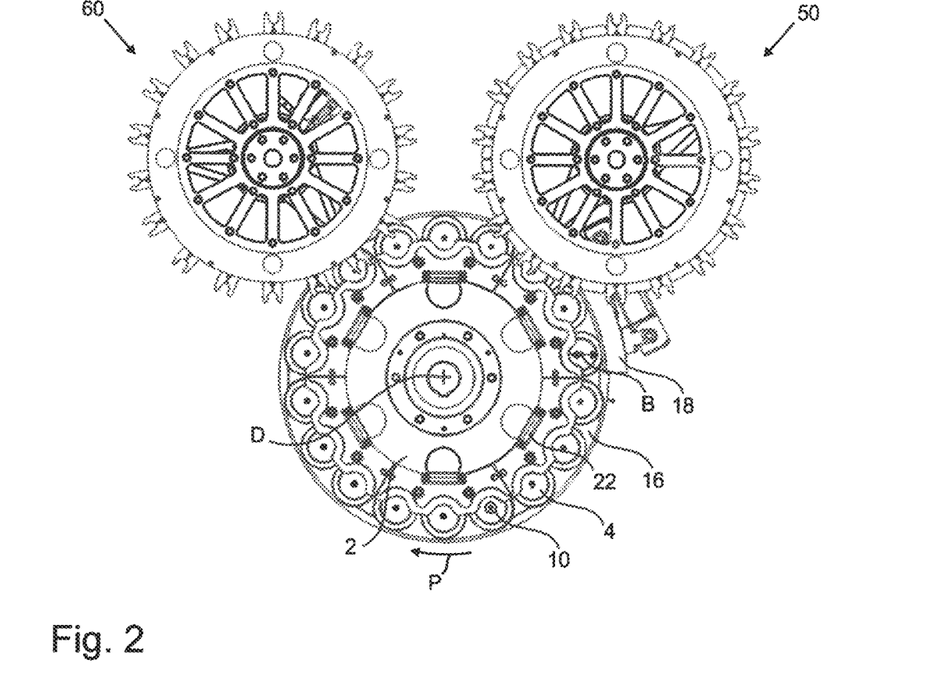
FIG. 2 shows a rough schematic plan view of a movable support with attached disc supports.

FIG. 2 shows an apparatus 1 according to the invention in plan view. Here substantially the same elements and devices can be seen as in FIG. 1. For example, the support 2 which is rotatable about the axis of rotation D can also again be seen here, likewise the receiving discs 4, wherein here too in each case three receiving discs 4 are again arranged on a disc support 16. Here too, the receiving discs 4 again also serve to receive the containers 10 which are being handled or transported along a transport path P.

The guide fitting 18 can also be seen here, wherein it can be seen better in FIG. 2 that the guide fitting 18 can change a width B of a transport path P by retraction and extension. The lever constructions 22 can be seen in plan view, and it can also be seen that a lever construction 22 is associated with each disc support 16. For the sake of completeness, a feed device 50 which feeds the containers 10 to the apparatus 1 and a discharge device 60 which discharges the containers 10 from the apparatus 1 are also shown in this drawing.

Furthermore, the apparatus has decorating devices (not shown), which in particular are arranged stationary along the transport path of the containers. As mentioned, in this case these devices may in particular be labelling devices which provide the containers with labels, or also printing elements which print on the containers.

Figure 3:
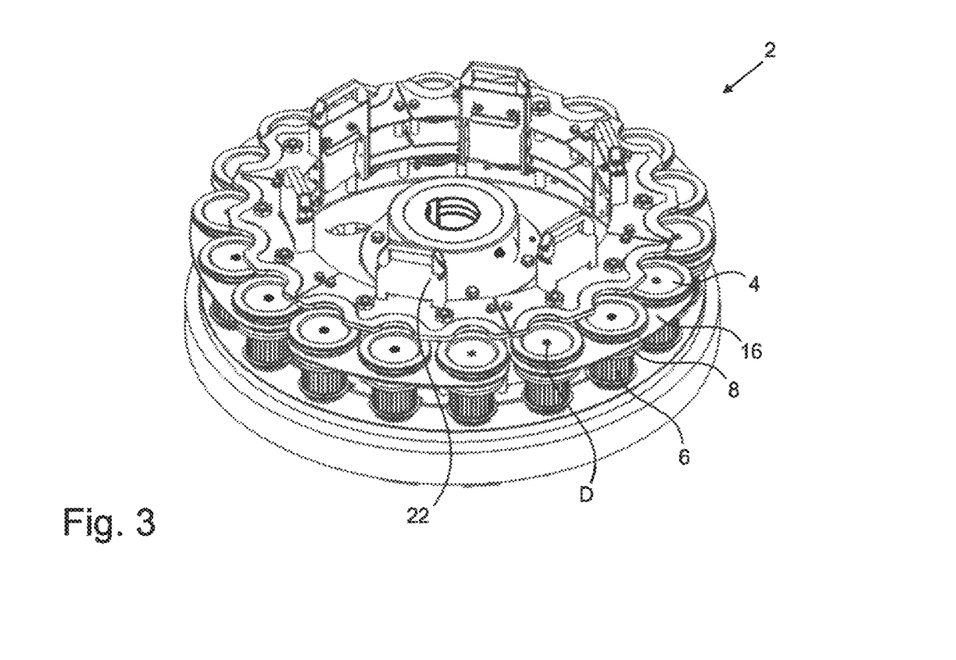
FIG. 3 shows a somewhat more precise representation of a rotatable support.

FIG. 3 shows a somewhat more precise representation of a rotatable support 2. This drawing likewise again shows the variant in which in each case three receiving discs 4 are arranged on a disc support 16. Likewise, it can be seen from this drawing that the receiving discs 4 are coupled by means of coupling means 8 to drive means 6, so that the individual receiving discs 4 can be rotated about an axis of rotation D. Each disc support 16 is connected to a lever construction 22, so that the individual disc supports 16 can be released from the rotatable support 2.

Figure 4:
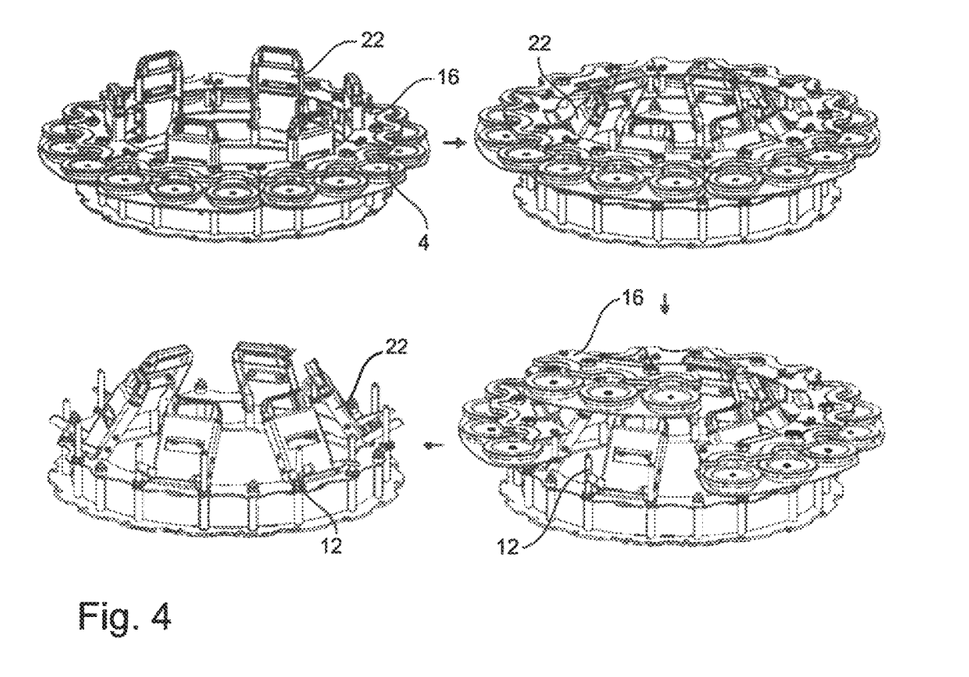
FIG. 4 shows a sequence for release of the disc supports.

FIG. 4 shows a sequence of how, for example, the individual disc supports 16 can be released and thus taken out from an apparatus 1. Here too again in each case three receiving discs 4 are arranged on a disc support 16. The individual disc supports 16 are connected by means of a lever construction 22 to the apparatus. If the lever elements 22 are located, for example, in a perpendicular position, the disc supports 16 are connected to the apparatus and cannot be removed. Likewise, in this drawing it can be seen that the individual disc supports 16 can be released by actuation of the lever elements 22 by inclination of the lever means 22 in the direction of the axis of rotation. It can also be seen that the disc supports 16 are additionally secured against release in that here, for example, the disc supports can be fitted onto lugs 12. It will be recognised that if a lever element 22 is inclined in the direction of the axis of rotation a disc support 16 can be pushed upwards and thus can be removed from the apparatus.

Figure 5A:
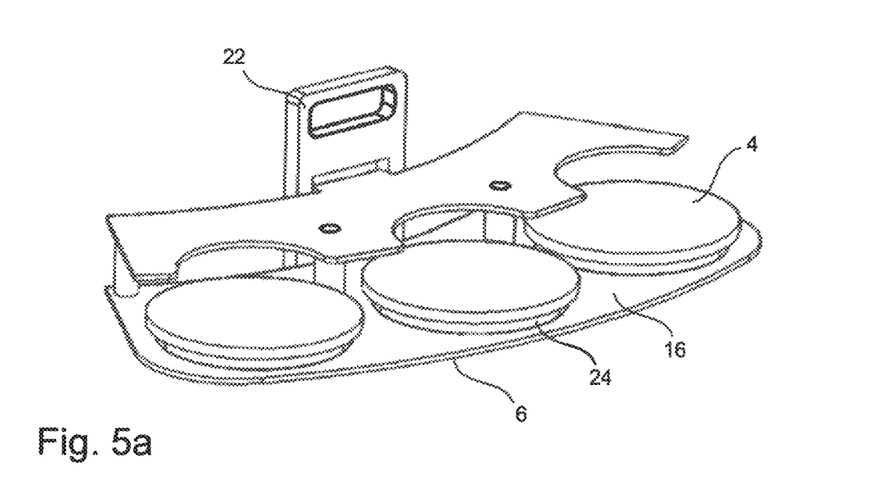
FIG. 5a shows a somewhat more precise representation of a disc support.

FIG. 5a shows a quite schematic representation of a disc support 16. Here too a lever construction 22 is again shown which is associated with the disc support 16. This drawing also again shows the embodiment in which three receiving discs 4 are associated with a disc support 16. It is shown roughly schematically here that the individual receiving discs 4 are centred autonomously by means of a draft angle 24 relative to the drive means 6, which are not visible in this view since they are located on the underside of the disc support 6.

Figure 5B:
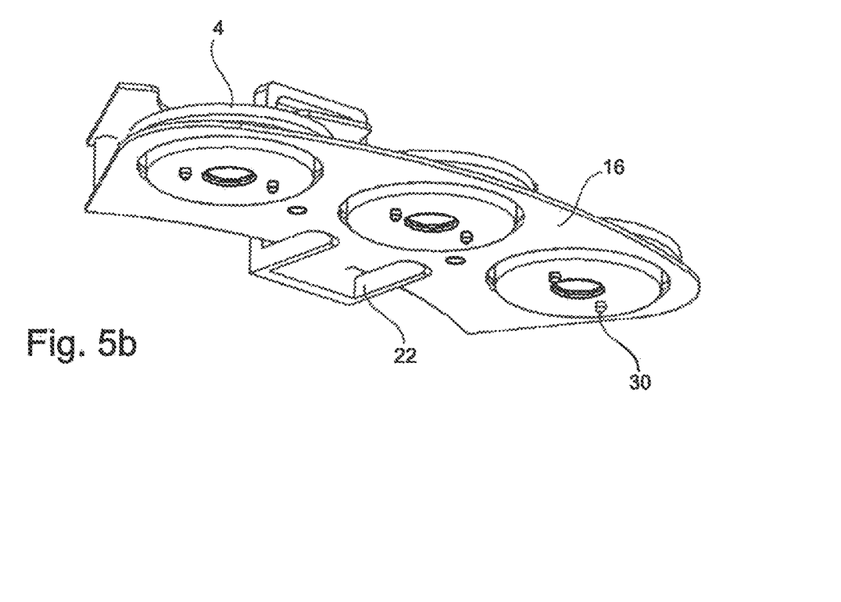
FIG. 5b shows a somewhat more precise representation of a disc support from below.

FIG. 5b shows a rough schematic representation of the underside of a disc support 16. This again also shows a lever construction 22 which is associated with the disc support 16. Furthermore, here too the embodiment is again shown in which three receiving discs 4 are associated with the disc support 16. Here too the connecting unit 30 can be seen which is configured, for example, as a stud bolt 30. The stud bolts 30 can be seen, since in this representation the drive means 6, in which the stud bolt would otherwise engage, have been omitted.

FIG. 5c again shows a rough schematic representation of a disc support 16. Here too again the disc support 16, the receiving discs 4 as well as the plurality of recesses 14 and the stud bolts can be seen. Here, however, three different representations are shown. On the right it can be seen that a receiving disc 4 has already been inserted onto/into the disc support 16, but the receiving disc 4 is not yet connected to the drive means 6.

Figure 5C:
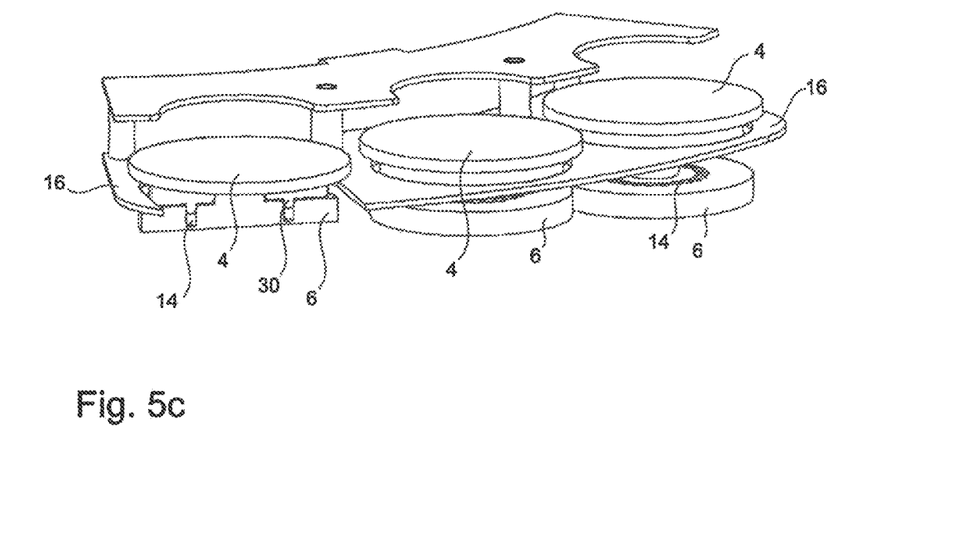
FIG. 5c shows a somewhat more precise representation of a disc support.

This leads to the plurality of recesses 14 being visible, which here for example are mounted on the drive means 6. In the middle of the representation of the disc support 16 a receiving disc 4 can also again be seen. However, here the receiving disc 4 has already been connected to the drive means 6. The representation on the left shows a sectional representation. It can be seen here that a receiving disc 4 has been fitted onto the disc support 16 and the receiving disc 4 engages by means of the stud bolt 30 in the recesses 14 of the drive means 6, so that the receiving discs 4 are connected by positive engagement and non-rotatably to the drive means 6.

Figure 6A:
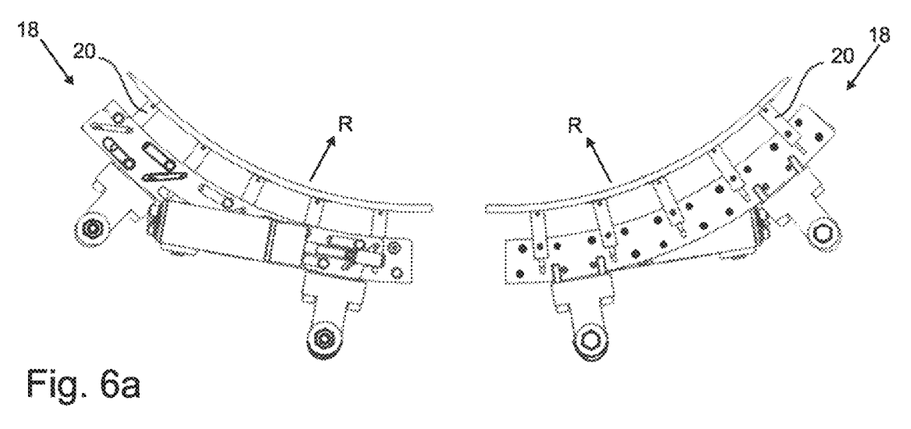
FIG. 6a shows a rough schematic representation of a guide fitting in the extended state.

FIG. 6a shows roughly schematically a guide fitting 18 in the extended state. The guide fitting 18 has a servo motor which is not shown. The adjustment means 20 are shown which are associated with the guide fitting 18 and which make the guide fitting 18 movable with the aid of the servo motor. Due to this servo motor (not shown) and the adjustment means 20, the guide fitting 18 can be moved in the radial direction R and thus can change the width of a transport path for the containers. In the example illustrated in FIG. 6a the guide fitting 18 is fully extended, that is to say the guide fitting 18 or the guide curve provides the transport path of the containers, so that the transport path has a narrower width. In this case a sectional representation of the guide fitting 18 can also be seen in FIG. 6a.

Figure 6B:
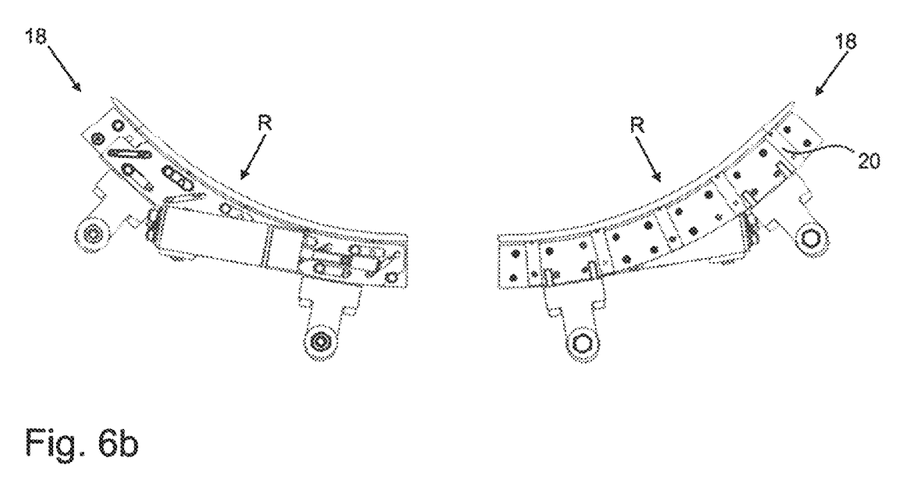

FIG. 6b shows roughly schematically a guide fitting 18. This time, however, it is shown in the retracted state. In other words, the servo motor, which again is also not shown here, has retracted the adjustment means 20, with the result that the guide fitting 18 or the guide curve is moved in the radial direction so that a transport path of the containers is larger, so that containers with a larger diameter can be transported. In this case a sectional representation is again illustrated, so that the retracted adjustment means 20 are visible.

The applicant reserves the right to claim all the features disclosed in the application documents as essential to the invention in so far as they are individually or in combination novel over the prior art. Furthermore it is pointed out that features which may be advantageous per se have also been described in the individual drawings. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 apparatus
2 support
4 receiving disc
6 drive means
8 coupling means
10 container
12 lug
14 recesses
16 disc support
18 guide fitting
20 adjustment means
22 lever construction
24 draft angle
26 lift curve
28 holding element
30 connecting unit/stud bolt
50 feed device
60 discharge device
B width
P transport path
R radial direction

The invention claimed is:

1. An apparatus for handling containers comprising a rotatable support which is rotatable about an axis of rotation (D), wherein a plurality of receiving discs are arranged on the rotatable support, wherein the receiving discs are each rotatable about axes of rotation and are configured for supporting the containers, wherein a drive unit, which is rotatable about predetermined axes of rotation is arranged on the rotatable support and which is coupled non-rotatably to the receiving discs, wherein the receiving discs are removable from the drive unit, and the drive unit and/or the receiving discs have a coupling unit configured to transmit torque between the drive unit and the receiving discs, wherein the apparatus has at least one disc support, wherein at least one receiving disc is rotatably arranged on the disc support, and the disc support jointly with the receiving disc arranged thereon is removable from the apparatus, and wherein the disc support is stationary with respect to the rotatable support.

2. The apparatus according to claim 1, wherein the coupling unit has projections which are arranged on the receiving discs and/or on the drive unit and which are configured to engage in recesses arranged on the drive unit and/or on the receiving discs.

3. The apparatus according to claim 2, wherein the coupling unit is formed in two parts, wherein a first part is configured to provide a rotary coupling by a form fit, and wherein a second part is configured to produce an axial coupling.

4. The apparatus according to claim 2, wherein starting from the axis of rotation (D) of the support a guide fitting is provided which is bent and spaced apart in the radial direction relative to the receiving discs, so that a transport path (P) of the containers is produced between a fitting on the disc support and the guide fitting.

5. The apparatus according to claim 2, wherein the receiving discs in released position is manually removable from the rotatable support.

6. The apparatus according to claim 1, wherein the coupling unit is formed in two parts, wherein a first part is configured to provide a rotary coupling by a form fit, and wherein a second part is configured to provide an axial coupling.

7. The apparatus according to claim 1, wherein a plurality of recesses are arranged on the drive unit and/or the receiving discs, which are adjacent relative to one another in a peripheral direction and have a spacing in the peripheral direction which is les than 60°.

8. The apparatus according to claim 1, wherein at least two receiving discs are arranged on the disc support and/or at most eight receiving discs are arranged on the disc support.

9. The apparatus according to claim 1, wherein starting from the axis of rotation (D) of the rotatable support a guide fitting is provided which is bent and spaced apart in the radial direction relative to the receiving discs, so that a transport path (P) of the containers is produced between a fitting on the disc support and the guide fitting.

10. The apparatus according to claim 9, wherein the guide fitting has an adjustment unit for changing a radius of curvature of the guide fitting.

11. The apparatus according to claim 9, wherein the guide fitting is automatically adjustable.

12. The apparatus according to claim 9, wherein the guide fitting is displaceable in the radial direction (R), wherein the width (B) of the transport path (P) can be adapted by the displacement of the guide fitting to the diameter of the containers.

13. The apparatus according to claim 1, wherein the receiving discs can be locked on the rotatable support or can be released from the support by a self-locking lever construction and/or by a movable lift curve.

14. The apparatus according to claim 1, wherein the receiving discs in a released position is manually removable from the rotatable support.

15. The apparatus according to claim 1, wherein the receiving discs are centred autonomously by a draft angle relative to the drive unit and/or can be connected by positive engagement and non-rotatably to the drive unit by stud bolts.

16. The apparatus according to claim 1, wherein the apparatus has at least one decorating device which provides the containers with a decoration.

17. A machine for handling containers comprising a rotatable support which is rotatable about an axis of rotation (D), wherein a plurality of receiving discs are arranged on the rotatable support, wherein the receiving discs are each rotatable about axes of rotation and support the containers, wherein a drive unit, which is rotatable about predetermined axes of rotation is arranged on the rotatable support and which is coupled non-rotatably to the receiving discs, wherein the receiving discs can be removed from the drive unit, and the drive unit and/or the receiving discs have a coupling unit configured to transmit torque between the drive unit and the receiving discs, wherein the machine has at least one disc support, wherein at least one receiving disc is rotatably arranged on the disc support, and the disc support jointly with the receiving disc arranged thereon is removable from the apparatus, and wherein the disc support is stationary with respect to the rotatable support.

* * * * *